(12) United States Patent
Lewis (10) Patent No.: US 6,624,819 B1
(45) Date of Patent: Sep. 23, 2003

(54) METHOD AND SYSTEM FOR PROVIDING A FLEXIBLE AND EFFICIENT PROCESSOR FOR USE IN A GRAPHICS PROCESSING SYSTEM

(75) Inventor: Michael C. Lewis, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 487 days.

(21) Appl. No.: 09/590,788

(22) Filed: Jun. 8, 2000

Related U.S. Application Data (60) Provisional application No. 60/201,032, filed on May 1, 2000.

(51) Int. Cl.⁷ .................................................. G09G 5/37
(52) U.S. Cl. .................. 345/561; 345/503; 345/505; 712/2
(58) Field of Search ................. 345/501–506, 345/519–520, 522, 530–574; 712/2, 7, 9, 223, 220

(56) References Cited

U.S. PATENT DOCUMENTS 4,799,183 A    1/1989  Nakano et al.
5,187,796 A    2/1993  Wang et al.
6,401,194 B1 *  6/2002  Nguyen et al. ............. 712/210
6,417,851 B1 *  7/2002  Lindholm et al. .......... 345/426
6,417,858 B1 *  7/2002  Bosch et al. ................ 345/522
6,425,054 B1 *  7/2002  Nguyen ....................... 711/117

OTHER PUBLICATIONS

IEEE Pacific Rim Conference on Communications, Computers and Signal Processing, May 9–10, 1991 "a High Performance Parallel Computing System for Imaging and Graphics", H. W. Park, et al.

* cited by examiner

Primary Examiner—Kee M. Tung
(74) Attorney, Agent, or Firm—Sawyer Law Group LLP (57) ABSTRACT

A method and system for processing graphics data in a computer system are disclosed. The method and system including providing a general-purpose processor and providing a vector co-processor coupled with the general-purpose processor. The general-purpose processor includes an instruction queue for holding a plurality of instructions. The vector co-processor is for processing at least a portion of the graphics data using a portion of the plurality of instructions. The vector co-processor is capable of performing a plurality of mathematical operations in parallel. The plurality of instructions is provided using software written in a general-purpose programming language.

26 Claims, 4 Drawing Sheets

METHOD AND SYSTEM FOR PROVIDING A FLEXIBLE AND EFFICIENT PROCESSOR FOR USE IN A GRAPHICS PROCESSING SYSTEM

CROSS-REFERENCE TO RELATED APPLICATION

The present application claims priority to U.S. Provisional Patent Application Serial No. 60/201,032, filed May 1, 2000.

FIELD OF THE INVENTION

The present invention relates to computer graphics systems, and more particularly to a flexible and efficient method and system for performing processing for computer graphics systems.

BACKGROUND OF THE INVENTION

A conventional computer graphics system can display a graphical image on a display. The graphical image typically includes a plurality of objects. Often, for three-dimensional graphics applications, these objects are three-dimensional objects which are to be displayed on a two-dimensional display. Prior to rendering the objects to the display, data for the objects are processed. For example, each of the objects is typically represented as a plurality of vertices. Each of the vertices is given three-dimensional coordinates in a particular space. The data are typically transformed to a different coordinate system at least once during processing of the data. An object is typically defined by assigning the vertices of the object to coordinates in object space. Coordinates in object space are based on their position with respect to a particular single vertex on the object. Thus, each vertex is assigned coordinates in object space using the position of the vertex relative to a particular point on the object. Typically, a vertex can be represented by a four-dimensional vector including three coordinates of the object with respect to a particular vertex of the object and the coordinates of the particular vertex. Thus, each vertex can be considered to be a vector. In order to place the object in the graphical image, or world space; the data for the vertices are transformed from object space to the world space of the graphical image. The data may also be transformed from world space to viewer space, which is defined with respect to a view plane, for example a screen of the display. Lighting for the graphical image is also generally processed prior to rendering the graphical image, typically while the object is in world space coordinates. Lighting for a particular portion of the object depends on the position of the object in world space and the position of one or more light sources in the graphical image. Depending on these factors, lighting for a portion of an object can be determined.

Conventional computer graphics systems use different conventional mechanisms in order to process data for objects, including transformations between coordinate systems and determinations of lighting values. Some conventional computer graphics systems simply rely on a general-purpose central processing unit ("CPU") of the computer system to perform the data processing: This allows normal programming languages to be used for instructing the computer system on how to process the data.

Although a conventional general-purpose CPU can be used, one of ordinary skill in the art will readily realize that only the standard mathematical operations and hardware generally available for the conventional general-purpose CPU can be used in processing the data for the objects. For example, the standard floating point unit, which is capable of a multiply or a multiply add per clock cycle, is used. Because vertices are typically represented as a vector, matrix operations are used to transform vertices from one coordinate system to another. Conventional general-purpose CPUs perform operations one at a time. Transforming each vertex requires a matrix multiplication for the vector representing the vertex. Conventional general-purpose CPU can only execute a single operation, i.e. one multiply or one multiply-add operation, per clock cycle. Consequently, a matrix may typically take at least sixteen to thirty-two clocks to finish a transformation. Moreover, a general purpose CPU will also typically require many load operations to move the data from system memory into the CPU's registers. Thus, the transformation may take even longer. The general purpose CPU will then have to store the data back to memory. Considering that most CPU's may incur a cache miss penalty when fetching from system memory, a matrix multiply could take as long as several hundred cycles. Transformations are also performed multiple times, once for each of each vertex. Performing the transformations for an object will thus consume many clock cycles and be relatively slow.

Furthermore, the conventional general-purpose CPU is typically not optimized for many operations used in three-dimensional graphics. For example, division operations are generally not critical operations. However, division operations are frequently used in three-dimensional graphics. Similarly, three-dimensional graphics often performs the same operations, such as a transformation, many times, on thousands of vertices of an object. A conventional general-purpose CPU, on the other hand, is typically optimized for performing different operations on different data. The hardware of a conventional general-purpose CPU is also not optimized for the operations generally performed for three-dimensional graphics. Thus, there is a great deal of hardware in the conventional general-purpose CPU that is not used during processing of graphics data. Furthermore, the data transfers typically used in three-dimensional graphics are not optimized in conventional general-purpose CPUs. Three-dimensional graphics typically reads in data for a vertex, multiplies the data by a transformation matrix, outputs the transformed data, and repeats this process for the remaining vertices to be transformed. This type of movement of data is not optimized in a conventional general-purpose.CPU. Thus, a conventional general-purpose CPU is thus less efficient at performing operations used in three-dimensional graphics. Furthermore, the conventional general-purpose CPU performs tasks other than processing of graphics data. Consequently, the resources of the conventional general-purpose CPU may be consumed with other tasks, slowing processing of data. Thus, although flexible, conventional general-purpose CPUs are inefficient at processing graphics data for a variety of reasons.

A second conventional method for processing graphics data is to use dedicated hardware, such as application specific integrated circuits ("ASICs"). Conventional ASICs are typically built to do a single operation, such as a matrix multiplication for a transformation or a determination of lighting values. Data is provided to the conventional ASIC, operated on, an output. Because a conventional ASIC is optimized for its function, the conventional ASIC does not consume extra space and is fast. For example, an ASIC which performs transformations is programmed with a matrix that is to be used in transforming the data. Data for a vertex is provided to the conventional ASIC, multiplied by the programmed matrix and output. This operation is performed relatively efficiently.

In order to process data for the graphical image, ASICs which have different functions are coupled serially. For example in one conventional system, a first conventional ASIC may be for performing a first transformation. A second conventional ASIC is for determining lighting values. A third conventional ASIC is for performing a second transformation. A set of conventional ASICs is for performing clipping to ensure that only the appropriate portion of the world for the graphical image is provided to the display. Data for a vertex is provided to the first conventional ASIC and transformed. The transformed data is provided to the second conventional ASIC, where lighting values for the vertex are calculated. The data for the vertex is again transformed by the third conventional ASIC. The data may then be clipped by the set of conventional ASICs. This is repeated for each of the vertices of each object being processed. Consequently, data for a graphical image can be processed, then rendered.

Although conventional ASICs can process graphical data rapidly, one of ordinary skill in the art will readily recognize that the conventional ASICs are not flexible. Because the function of a conventional ASIC is determined by the hardware, the function cannot be altered. Thus, an ASIC which is built for performing transformations may be incapable of determining lighting values or performing other functions. If different functions are desired, new conventional ASICs must be provided. Consequently, a conventional computer graphics system that relies on conventional ASICs to process data is inflexible.

Another conventional method for processing graphics data prior to rendering utilizes a conventional special-purpose CPU. The conventional special-purpose CPU is optimized for performing transformations, determination of lighting values and other tasks used in processing three-dimensional graphics data. The conventional special-purpose CPU is highly customized for processing graphics data. In order to program the conventional special-purpose CPU, proprietary microcode from the manufacturer must be used. Microcode controls the operation of the conventional special-purpose CPU at a very fine level. Using microcode, tasks performed by the conventional special-purpose CPU can be changed. Thus, the conventional special-purpose CPU is relatively flexible and, because the conventional special-purpose CPU is optimized for processing three-dimensional graphics data, relatively efficient.

Although the conventional special-purpose CPU can be used in processing data for a graphical image, one of ordinary skill in the art will readily realize that there are drawbacks to using the conventional special-purpose CPU. The conventional special-purpose CPU is not readily extensible to other systems because the microcode specified by the manufacturer is proprietary. Furthermore, microcode for the conventional special-purpose CPU is generally very specific. For example, when instructing the conventional special-purpose CPU to perform an add operation on two numbers, a programmer would have to provide instructions for obtaining the numbers from specific registers, transferring the data to the adder and selecting a particular function, addition, from the adder. The developer must also specifically account for special cases that cannot be treated using the specialized instructions for the general case. Thus, development of code is made more difficult because the developer must control the operation of the conventional special-purpose CPU at a much finer level and be aware of exactly how the conventional special-purpose CPU functions. Furthermore, although the conventional special-purpose CPU is typically more efficient, the speed at which the conventional special-purpose CPU operates depends upon the implementation of the microcode. Consequently, the speed of the conventional special-purpose CPU may not be significantly improved. Thus, the flexibility, speed and ease of exploiting the conventional special-purpose CPU may be limited.

Accordingly, what is needed is a flexible, efficient system and method for processing graphics data for objects, such as three-dimensional objects. The present invention addresses such a need.

SUMMARY OF THE INVENTION

The present invention provides a method and system for processing graphics data in a computer system. The method and system including providing a general-purpose processor and providing a vector co-processor coupled with the general-purpose processor. The general-purpose processor includes an instruction queue for holding a plurality of instructions. The vector co-processor is for processing at least a portion of the graphics data using a portion of the plurality of instructions. The vector co-processor is capable of performing a plurality of mathematical operations in parallel. The plurality of instructions is provided using software written in a general-purpose programming language.

According to the system and method disclosed herein, the present invention provides a system for processing graphics data, particularly three-dimensional graphics, which is efficient and flexible.

DETAILED DESCRIPTION OF THE INVENTION

The present invention relates to an improvement in graphics systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Various mechanisms can be used for processing graphics data prior to rendering. For example, conventional computer systems may utilize a conventional-general purpose central processing unit ("CPU"), dedicated hardware such as conventional application specific integrated circuits ("ASICs"), or conventional special-purpose CPUs. Each conventional method has its drawbacks. The conventional general-purpose CPU is flexible, but rather inefficient. The conventional general-purpose CPU is not optimized for many of the operations used in graphics processing, making the conventional general-purpose CPU relatively slow and leaving at least some of the hardware for the general-purpose conventional CPU unused during graphics data processing. The conventional ASICs can be optimized for their individual functions and are, therefore, relatively fast. However, the functions of the conventional ASICs reside in hardware, making the conventional ASICs inflexible. The conventional special-purpose CPU is somewhat flexible and can be optimized for processing graphics data. However, the conventional special-purpose CPU typically utilizes proprietary microcode provided by a maker of the conventional special-purpose CPU. As a result, the conventional special-purpose CPU requires a developer to have greater knowledge of the system and makes programming more difficult.

The present invention provides a method and system for processing graphics data in a computer system. The method and system including providing a general-purpose processor and providing a vector co-processor coupled with the general-purpose processor. The general-purpose processor includes an instruction queue for holding a plurality of instructions. The vector co-processor is for processing at least a portion of the graphics data using a portion of the plurality of instructions. The vector co-processor is capable of performing a plurality of mathematical operations in parallel. The plurality of instructions is provided using software written in a general-purpose programming language.

The present invention will be described in terms of a particular system. However, one of ordinary skill in the art will readily recognize that this method and system will operate effectively for other systems, for example other types of processors and co-processors, other dimensional vectors, and other operations performed by the processor and the co-processor.

Figure 1:
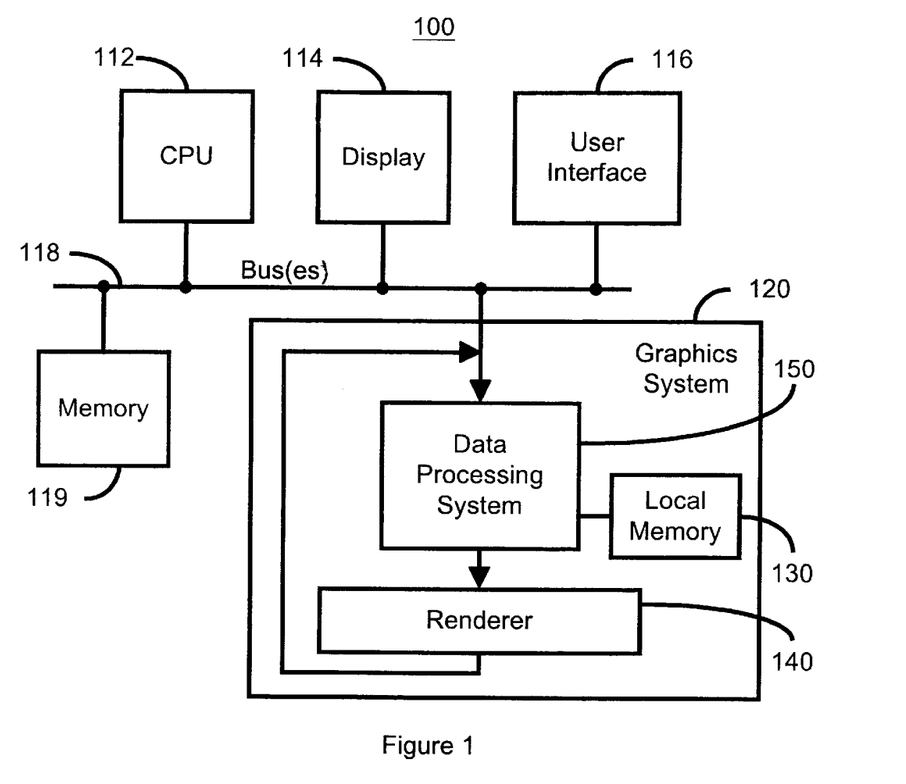
FIG. 1 is a high-level block diagram of one embodiment a computer system which utilizes the computer graphics system in accordance with the present invention.

To more particularly illustrate the method and system in accordance with the present invention, refer now to FIG. 1, depicting a high-level block diagram of a computer system 1100 using the computer graphics system 120 that incorporates the data processing system 150 in accordance with the present invention. In a preferred embodiment, the system 150 in accordance with the present invention is utilized in the computer graphics system 100, which renders an image pixel-by-pixel. The computer system 100l may include a central processing unit (CPU) 112, a display 114, a user interface 116 such as a keyboard or mouse or other communicating device, a memory 119, and the computer graphics system 120 coupled with one or more buses 118. However, in some embodiments, one or more of the components may be omitted, and other components may be added. For example, in some embodiments, the CPU 112 is not included. The display 114 includes a display, such as a monitor (not explicitly shown) that includes a plurality of pixels. The display 114 could include a display memory (not shown) to which pixels are written. In order to display graphical images, the objects are broken into polygons to be used in rendering the objects. In a preferred embodiment, the polygons are rendered in raster order. That is, portions of the polygons are rendered pixel by pixel in the order of the pixels in the display 114. In a preferred embodiment, the polygons are rendered in raster order. That is, portions of the polygons are rendered pixel by pixel in the order of the pixels in the display 114.

The computer graphics system 120 is used in rendering the graphical image. The computer graphics system 120 includes the data processing system 150 in accordance with the present invention, a renderer 140, and a local memory 130. Thus, in a preferred embodiment, the system 100 includes the system memory 119 and the local device memory 130. However, in an alternate embodiment the either system memory 119 or the local memory 130 may be omitted. The data processing system 150 performs operations on graphics data, such as transformations, calculations of lighting values and other operations such as interpolations for clipping. The data processing system 150 may also perform other operations on graphics data or other data for the system 100 the renderer 140 performs various operations to ensure that the data output by the graphics system 120 is in the desired form for display. In a preferred embodiment, the renderer 140 renders data for a graphical image pixel by pixel. However, in an alternate embodiment, the renderer 140 may render data for the graphical image in another order, such as polygon by polygon. The functions performed by the renderer 140 may include, but are not limited to, identifying data describing portions of polygons ("intersecting polygons") which intersect the area extending along a z-axis from a selected pixel in an x-y plane corresponding to a screen of the display 114; processing intersecting polygons for a particular pixel in parallel; removing data for objects which are obstructed by other objects in the display; interpolating the data for the intersecting polygons, including interpolating texture, color, and alpha values for the intersecting polygon at a pixel; sorting the data for the intersecting polygons for a pixel 10) based on the value of a key such as the z value, or depth value, for the fragment; and performing antialiasing.

Figure 2:
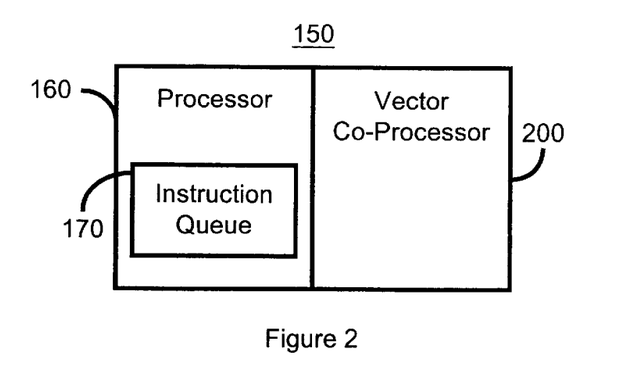
FIG. 2, is a high-level block diagram of the computer graphics system in accordance with the present invention.

FIG. 2 depicts a more detailed diagram of the data processing system 150 in accordance with the present invention. The data processing system 150 is preferably a floating point processing system that includes a processor 160 and a vector co-processor 200. The vector co-processor 200 is optimized for performing.operations on graphics data. Thus, the vector co-processor 200 is capable of performing multiple operations on data in parallel. For example, the vector co-processor 200 may be capable of performing n multiplies in parallel, allowing a dot product for an n-dimensional vector to be processed with a single cycle throughput. The vector co-processor 200 may, therefore, rapidly perform transformations or multiplications used in calculating lighting values. Thus, the vector co-processor 200 is preferably used for performing calculations which are relatively simple and generally performed a multitude of times for each graphical image. For example, the vector co-processor is preferably used in performing transformations, calculations of lighting values, clipping, and other similar tasks.

The processor 160 controls the co-processor 200 and is used for performing a variety of other tasks including more complex calculations involved in processing graphics data. The processor 160 is preferably a general-purpose processor, but may have relatively limited functionality. In a preferred embodiment, the processor 160 is a reduced instruction set computer ("RISC") processor. Also in a preferred embodiment, the processor 160 is extensible, allowing the vector co-processor 200 to be more easily utilized with the processor 160. In one embodiment, the processor 160 may, therefore, be a MIPS or ARM processor. The processor 160 includes an instruction queue 170. The instruction queue 170 holds instructions not only for the processor 160, but also for the vector co-processor 200. The instructions for the processor 160 and vector co-processor 200 are written in a general-purpose software language. The processor 160 can decode these instructions and provide the instructions in the instruction queue. Consequently, it is relatively easy to program the processor 160 and the vector co-processor 200. In a preferred embodiment, the instruction queue 170 also serves as an interface between the processor 160 and the vector co-processor 200. Thus, the processor 160 preferably places instructions in the instruction queue 170, while the vector co-processor 200 removes and executes the instructions.

Figure 3:
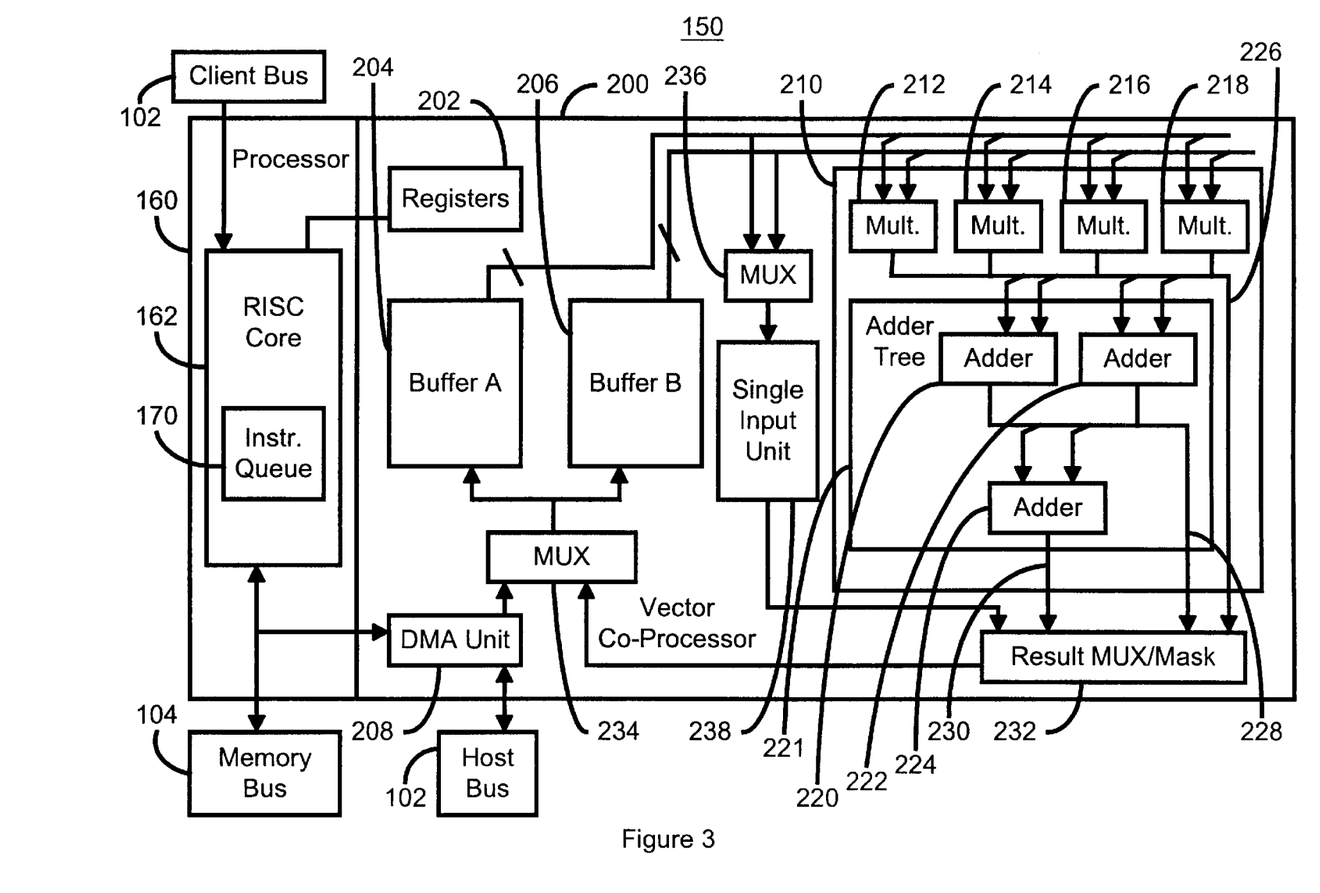
FIG. 3 is a more detailed block diagram of the computer graphics system in accordance with the present invention.

FIG. 3 depicts a more detailed block diagram of a preferred embodiment of the data processing system 150. The data processing system 150 includes the processor 160 and the vector co-processor 200. The processor 160 expressly includes a RISC core 162 and the instruction queue 170. A RISC core 162 may be used because it may be easier to interface the vector co-processor 200 with the RISC core 162 than with a more complex core. The processor 160 may also include other components not explicitly shown in FIG. 3. Standard operations, such as multiplications, will be defined for the processor 160 and may be provided using the RISC core 162 or the vector co-processor 200. The processor 160 is coupled to a client bus 102 and a memory bus 104. The client bus 102 allows the computer system 100 to provide commands to the processor 160. Using the client bus, the processor 160 can controlled. For example, using the client bus 102, the processor 160 can be woken up and the co-processor 200 instructed to boot up. The processor 160 can also be instructed to monitor a certain memory location or perform another task in preparation to obtaining and processing graphics data, as discussed below. The client bus 102 is preferably the back end of a bridge (not explicitly shown) between the CPU 112 shown in FIG. 1 and the host bus 106 of FIG. 3. However, where there is no CU 112 for the system 100, the processor 160 is woken up and provided instructions in another manner.

The memory bus 104 preferably allows the processor 160 access to the memory 130. The vector co-processor 200 is coupled with the host bus 106. The host bus 106 is preferably coupled with the memory 119. However, the host bus 106 and memory bus 104 could also be connected to different memories. The data processing system 150 can thus communicate with the memory 119, the local memory 130 or other portions of the system 100 via the host bus 106. The data processing system 150 is thus a slave when interacting with the system 100 via the client bus 102 and a master when interacting with the system 100 via the memory bus 104 or the host bus 106. Note that the client bus 102, the memory bus 104 and the host bus 106 are logically distinct, but need not be physically separate. For example, bus(es) 118 depicted in FIG. 1 can act as the client bus 102, the memory bus 104 and the host bus 106 depicted in FIG. 3. Instructions in the instruction queue 170 control operation of the processor 160 and the vector co-processor 200. Consequently, the data processing system can be controlled using a standard set of instructions and programmed using a standard programming language. Thus, the data processing system 100 is flexible.

The vector co-processor 200 is optimized for performing vector operations. The vector co-processor 200 is thus optimized for performing multiple operations in parallel. The vector co-processor 200 includes registers 202, buffer A 204, buffer B 206, a direct memory access ("DMA") unit 208, a vector data processing block 210, a result multiplexer/mask ("MUX/mask") block 232, multiplexers ("MUXs") 234 and 236, and a single input unit 238. The registers 202 for the vector co-processor 200 can be used in setting up data processing in the vector co-processor 200. For example, a portion of the registers 202 may hold the locations in the memory 130 or 119 from which data is obtained by the DMA unit 208 and the locations in the memory 130 or 119 to which processed data is to be returned. Other registers 202 may actually be pointers or some other mechanism for determining locations, such as current locations, in the buffer A 206 or the buffer B 208 and allowing-the processor 160 to directly access the locations in the buffer A 206 or the buffer B 208. Although not explicitly depicted in FIG. 3, the register 202 are preferably connected to the remaining components of the vector co-processor 200.

The vector data processing block 210 can performs multiple operations in parallel, as discussed below. The vector data processing block 210 is, therefore, capable of performing operations on multiple components of a vector. The single input unit 238 performs single input operations, such as reciprocals, square roots and cosines. The multiplexer 236 determines whether an input from buffer A 204 or buffer B 206 is to be used by the single input unit 238. The result MUX/mask block 232 selects between resultants from the vector data processing block 210 and the single input unit 238. The result MUX/mask block 232 also determines where in an entry for the buffer A 204 or the buffer B 206 a resultant from the vector data processing block 210 or from the single input unit 238 should go. For example, in a preferred embodiment, the resultant can be between thirty-two and one hundred and twenty-eight bits wide. The buffers A 204 and B 206 are each one hundred and twenty-eight bits wide. Consequently, the result MUX/mask block 232 determines where in the width of the buffers A 204 or B 206 the resultant should be placed.

The buffers A 204 and B 206 are provided with graphics data by the DMA unit 208. The DMA unit 208 can also return data from the buffers A 204 and B 206 to memory 119 or local memory 130. The MUX 234 determines which of the buffers A 204 or B 206 are to be provided with data at a particular time. In a preferred embodiment, the buffers A 204 and B 206 are provided with data alternatively. Furthermore, data in one buffer can be processed while data is being written to another buffer. Thus, data in the buffer A 204 can be processed, for example using the vector data processing block 210, while the buffer B 206 is being filled with data, and vice versa. Because the buffers A 204 and B 206 are filled alternatively and data in one buffer can be processed while data is written to the other buffer, the efficiency of the vector co-processor is improved.

The vector data processing block 210 includes multipliers 212, 214, 216-and 218; an adder tree 221 including adders 220, 222, and 224; and resultant paths 226, 228 and 230. Because of the multipliers 212, 214, 216 and 218 in the embodiment shown, the vector data processing block 210 is capable of performing four multiplies in parallel. Preferably, data in buffer A 204 or buffer B 206 is multiplied by a matrix in buffer B 206 or buffer A 204, respectively. In a preferred embodiment, a dot product for a four-dimensional vector can be performed with a single cycle throughput. This allows the vector co-processor 200 to rapidly and efficiently perform transformations. Note that although a matrix is stored in the buffers A 204 or B 206 whose data is not being processed, the buffers A 204 or B 206 can still concurrently be filled with data. This is because the buffers A 204 and B 206 are preferably significantly larger than the size of the matrix being used. To do so, the instructions in the instruction queue are used to control the vector co-processor 200, as discussed below.

The multipliers 212, 214, 216 and 218 are connected to the adder tree 221. The adder tree 221 includes the adders 220, 222 and 224. Thus, in the embodiment shown, an addition of the resultants from the multipliers 212, 214, 216 and 218 can be performed. The adders 220 and 222 form a first stage of the adder tree 221 and add the resultants from two or more of the multipliers 212, 214, 216 and 218. The resultants of the adders 220 and 222 can be added by the adder 224, which is the second stage of the adder tree 221. Note that another number of adders could be provided in the adder tree 221.

The resultant paths 226 and 228 allow the adder tree 221 to be bypassed. The resultant paths 226 and 228, therefore, provide the output of the multipliers 212, 214, 216 or 218 and the output of the adders 222 and 224, respectively, to the result MUX/mask 232. The resultant path 230 provides the output of the adder tree 221 to the result MUX/mask 232. The resultant provided along the resultant path 226 can be viewed as a dot product of two four-dimensional vectors, for example to be used in a transformation. Similarly, four independent multiplications performed simultaneously can be output via the resultant path 226. Such an operation would be useful in calculating lighting values. The resultant path 228 can output the quantity A*B+C*D, where A, B, C, and D are inputs, for example, to the multipliers 212 and 214. This quantity is useful in performing linear interpolations, such as for clipping. Similar combinations can be provided via the resultant path 228. The resultant path 230 can output the quantity A*B+C*D+E*F+G*H, where A and B. C and D, E and F, and G and H are inputs to multipliers 212, 214, 216 and 218 respectively. Thus, the resultant path 230 can provide combinations of a plurality of multiplications and a plurality of additions. These resultant paths 226, 228 and 230 allow the above results to be provided efficiently, without having to pass through extraneous stages of the adder tree 221. Consequently, the resultant paths 226 228 and 230 allow the vector data processing block 210 to operate more efficiently and to provide more operations than merely matrix multiplications.

Using the data processing system 150, graphics data can be efficiently processed, particularly using the vector-coprocessor, 200. Multiple operations, for example on vectors which represent vertices of an object, can be performed in parallel. For example, for a transformation, vectors representing the vertices can be transferred, using the DMA unit 208, to the buffer A 204. A matrix to be used in the transformation can be stored in the buffer B 206. The appropriate vectors from the buffer A 204 and of the matrix stored in the buffer B 206 can be transferred to the multipliers 212, 214, 216, and 218, which perform the coordinate transformations. The transformed data is provided back to the buffer A 204. This process is repeated for the remainder of the data in the buffer A 204. In a preferred embodiment, the transformation of the data in buffer A 204 is performed by repeating a small number of instructions in the instruction queue 170. While the data for the buffer A 204 is being transformed, graphics data can be provided to the buffer B 206. Once transformation of the data in the buffer A 204 is completed, the transformed data can be output, preferably using the DMA unit 208, or further processed. This process of transforming data in one buffer while loading the other buffer can be repeated until all of the desired data is transformed.

In a preferred embodiment, the processor 160 is free to perform other tasks while the vector co-processor 200 processes the graphics data. The processor 160 can, therefore, perform more difficult operations on other graphics data or perform other functions while the vector co-processor 200 processes graphics data. Consequently, not only is the vector co-processor 200 efficient, but the data processing system 150 is also efficient. Furthermore, the data processing system 150 is flexible because of the programmability of the processor 160 and the vector co-processor 200. Moreover, because proprietary ton microcode need not be used, the data processing system 150 may be simpler to use and easier to optimize. This is because the processor 160 does not require control at as fine a level of detail as for a processor which uses microcode. Furthermore, because the host's CPU 112 depicted in FIG. 1 has little to do with the processing of graphics data performed by the data processing system 150, the data processing system 150 could be used in a system without a host CPU 150.

Referring back to FIG. 3, in a preferred embodiment, portions of the data processing system 150 are interlocked in order to ensure that the desired operations are performed in the proper order. In particular, a portion of the data processing system 150 implicitly waits for a sufficient portion of a previous operation, on which a current operations depends, to be performed by another portion of the data processing system 150 to complete to ensure that both operations are performed in the desired order. This allows the subsequent operation to begin execution before the previous operation has completed. For example, the DMA unit 208 may read data in from the memory 119 and write the data to buffer A 204 or buffer B 206. The operation of reading data from the buffer A 204 and buffer B 206 is interlocked so that data is read only from those locations in buffer A and buffer B that have already been written to by the DMA unit 208. If pointers are used, it is ensured that the location of the pointer for the read operation does not exceed the location of the pointer for the write operation in the buffer A 204 or buffer B 206. Similarly, it is ensured that the resultant of a vector operation is provided to the buffer A 204 or the buffer B 206 before the DMA unit 208 attempts to write the result to the memory 119 depicted in FIG. 1. Referring to FIGS. 1 and 3, if the buffer A 204 and buffer B 206 are merely used for copying data from one section of the memory 119 to another, the interlocking mechanism of the preferred embodiment would ensure that the data is copied from one section of the memory 119 to the buffer A 204 or buffer B 206 before the data is written to the new section of the memory 119. If multiple vector operations are to be provided on data provided to buffer A 204 and buffer B 206 by passing the data through the multipliers 212, 214; 216, and 218 and the adder tree 221 more than once, it is ensured that the resultant of one pass has been written to the buffer A 204 or the buffer B 206 before the resultant is read from the buffer A or the buffer B 206 for the next pass. Preferably, this interlocking mechanism is provided by ensuring that the pointer for a subsequent operation (such as a read) is at a location that is between the start and the current pointer of the previous operation (such as a write operation) on which the subsequent operation depends. If the subsequent operation cannot be performed without violating the interlocking rule above, then the operation waits (or stalls) until the violation is no longer true.

Figure 4A:
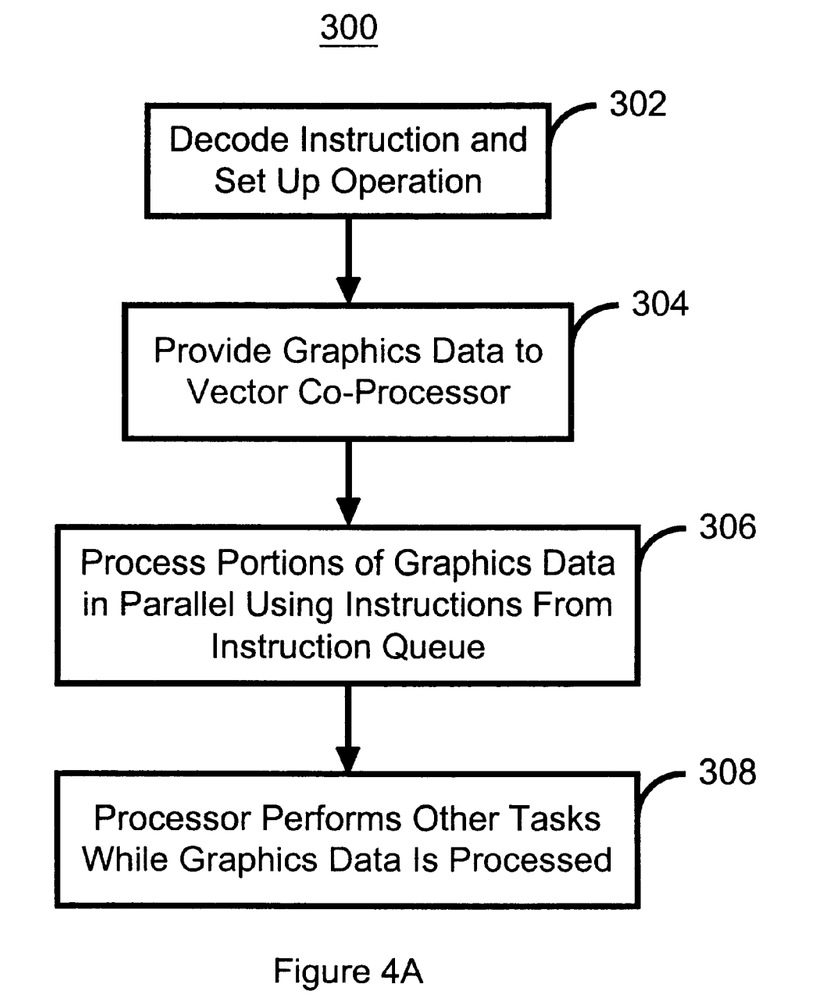
FIG. 4A is a high-level flow chart depicting one embodiment of a method for processing graphics data using the computer graphics system in accordance with the present invention.

FIG. 4A depicts a high-level flow chart of a method 300 for performing graphics data processing using the data processing system 150. The method 300 will, therefore, be explained with reference to FIGS. 3 and 4A. The method 300 preferably commences after the processor 160 has been woken up and after the initial setup for the processor 160 and the vector co-processor has been completed. The processor 160 decodes the program instructions provided, via step 302. Preferably, the instructions decoded are high-level instructions. For example, a high-level instruction may indicate that the data processing system 150 is to perform a transformation given a list of objects and a user's viewpoint. Also in step 302 some initial set-up is performed. At least a portion of the appropriate graphics data is provided to the vector co-processor 200, via step 304. In a preferred embodiment, the data is provided to the vector co-processor 200 using the DMA unit 208. The graphics data is then processed by the vector co-processor 200 using instructions in instruction queue 170, via step 306. Because the vector co-processor 200 is used, at least a portion of the data is processed in parallel. In a preferred embodiment, step 306 is performed by repeating a number of instructions in the instruction queue 170 enough times to process the desired data. In a preferred embodiment, the number of steps repeated is relatively small and performs a relatively simple calculation, such as a vector dot product for transformations between coordinate systems. Also in a preferred embodiment, steps 304 and 306 can be carried out concurrently by-processing data in one of the buffers 204 or 206 while the other buffer 206 or 266, respectively, is being filled with data. While the vector co-processor 200 processes the graphics data, the processor 160 performs other operations, for example by using the RISC core 162, via step 308. Thus, the vector co-processor 200 can perform relatively simple, repeated calculations used in processing the graphics data while the processor 160 performs other more complex operations which may be related to graphics data processing. As a result, processing of data is efficient, flexible, and relatively simple to control.

Figure 4B:
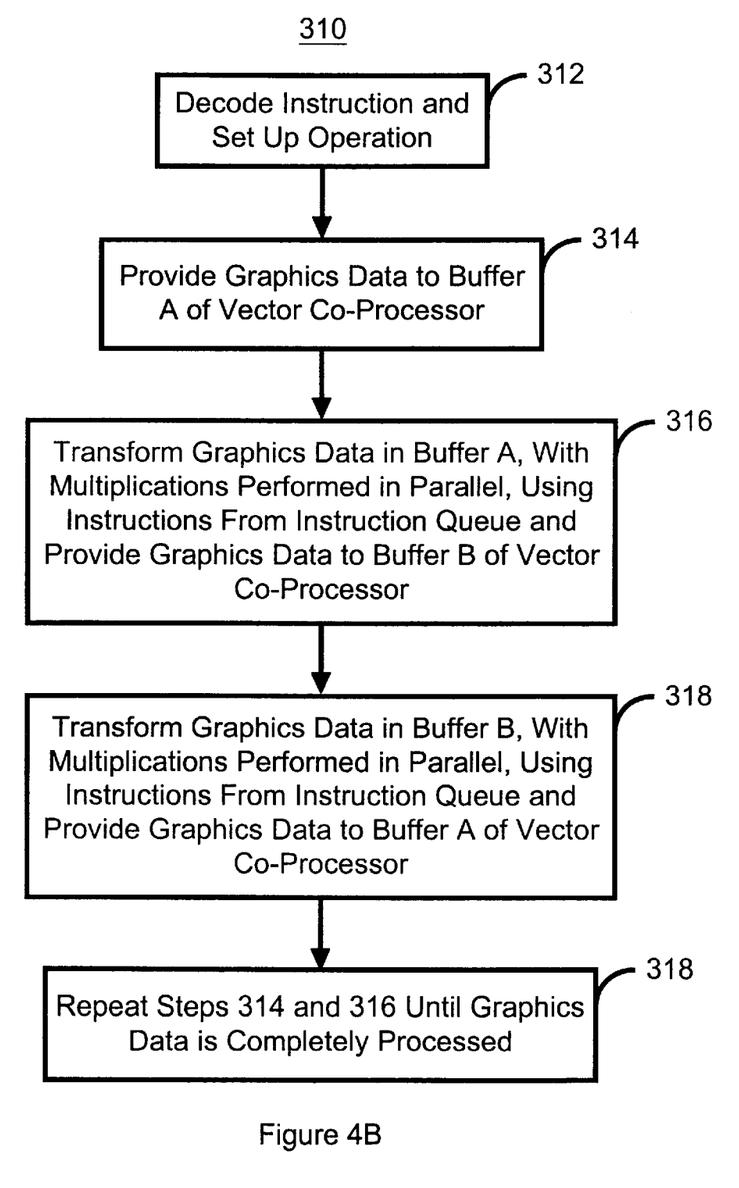
FIG. 4B is a more detailed flow chart depicting one embodiment for transforming graphics data using the computer graphics system in accordance with the present invention.

FIG. 4B depicts one embodiment of a method 310 for performing a coordinate transformation in accordance with the present invention. Thus, the method 310 presents a special case of a portion of the method 300 to further explicate the method 300. The method 310 will, therefore, be explained with respect to FIGS. 3 and 4B. An instruction for performing a coordinate transformation for a list of objects is decoded and the data processing system 150 set up, via step 312. Step 312 preferably includes obtaining the list of objects and the appropriate matrices to be used in transforming the objects from their current coordinate system to the desired coordinate system. Step 312 may also include loading the appropriate matrix into the desired buffer, presumed to be buffer B 206 initially. Buffer A 204 then provided with the desired data, via step 314. In a preferred embodiment, the data is provided to buffer A 204 using the DMA unit 208. Thus, the vertices (vectors) for the first object to be transformed are provided to the buffer A 204 using step 314. In a preferred embodiment, each buffer A 204 and B 206 is capable of holding thousands of vectors. Consequently, each buffer A 204 and B 206 may be capable of holding data for all of the vertices for a single object.

The data in buffer A 204 is processed using instructions from the instruction queue 170 and additional data, if any, is provided to buffer B 206, via step 316. Thus, an instruction in the instruction queue 170 and for providing data to the buffer B 206 is executed. The data provided to buffer B 206 could be for another object or the same object, depending on the size of the buffers 204 and 206 and the number of vertices in the objects. Preferably, the data in buffer A 204 is processed using only five instructions for four-dimensional vectors. The first four instructions control processing of the data, while the fifth instruction repeats the processing instructions. The first instructions provides the data for a particular vertex, a vector, stored in buffer A and data for the first vector, or column, of the matrix stored in buffer B 206 to the multipliers 212, 214, 216 and 218. One coordinate from each vector is provided to each multiplier 212, 214, 216 and 218. The multipliers 212, 214, 216 and 218 perform the multiplication and the result is provided back to the appropriate position, which will correspond to the first coordinate for the vertex in buffer A 204. The second instruction is the same as the first except that the particular vertex is multiplied by the next vector in the matrix and returns the result to a position which will correspond to the second coordinate location for the particular vertex. The third instruction multiplies the vertex by the third vector in the matrix and returns the result to apposition which will correspond to the third coordinate location for the particular vertex. The fourth instruction multiplies the vertex by the fourth vector in the matrix and returns the result to a position which will correspond to the fourth coordinate location for the particular vertex. The fifth instruction repeats the first four instructions for subsequent vertices which have not been processed and are stored in the buffer A 204. For example if the buffer A 204 holds two hundred vertices, the fifth instruction will indicate that the previous four instructions are to be repeated one hundred and ninety-nine times. Thus, the location for data from the buffer A 204, having data which is being processed, is incremented every four cycles. The location for matrix data from the buffer B is incremented each cycle, but returns to the first location every four cycles. Consequently, using step 316, a small number of instructions in the instruction queue 170 can be used to perform transformations for a large number of vertices. Also in step 316, the transformed data may be output, preferably via the DMA unit 208 when all of the data in the buffer A 204 has been transformed. In a preferred embodiment, step 312 also includes storing in buffer A 204 the matrix to be used in processing the data being stored in buffer B 206. Using the step 312, the transformation for a three-dimensional homogeneous vector can be performed in four cycles, with a single cycle throughput.

The data in-buffer B 206 is processed and additional data, if any, is provided to the buffer A 204, via step 318. The data provided to buffer A 204 could be for another object or the same object, depending on the size of the buffers 204 and 206 and the number of vertices in the objects. The data in buffer B 206 is preferably processed in the same manner discussed above, for the data stored in buffer A 204. Also in step 318, the transformed data in buffer B may be output and the matrix to be used in processing the data being stored in buffer A 204 is stored in buffer B 206. Steps 316 and 318 are then repeated until all the desired data has been transformed, via step 320. Because processing and filling of the buffers 204 and 206 is ping-ponged, the data paths are kept relatively full. Efficiency is thereby improved. Furthermore, the vector co-processor 200 can perform four multiplications in parallel. Thus, the vector co-processor 200 efficiently performs operations for vectors, thereby improving the speed at which graphics data can be processed.

While the data is being processed by the vector co-processor 200, the RISC core 162 of the processor 160 is free to perform other tasks. In the example above, where two hundred vertices are being processed, the RISC core 162 is free for approximately two hundred cycles. Other operations, particularly more complex operations performed in graphics data processing, may be provided using the RISC core 162. Consequently, efficiency of the data processing system 150 is further improved.

Although the method 310 has been described in the context of performing a transformation, one of ordinary skill in the art will readily realize that interpolations, calculation of lighting values and other operations may be processed similarly. In order to perform different operations, different instructions are used. These instructions can be provided in a standard, non-proprietary programming language. These instructions are decoded to provide, among other things, the instructions used in the instruction queue 170. The data processing system 150 is, therefore, flexible and relatively easy to use. For example, if interpolations to be used in clipping are performed, an instruction for clipping can be provided to and decoded by the processor 160. In such a case, two multiplications and an addition will be performed by the vector data processing block 210. Thus, two linear interpolations can be provided per cycle and clipping can be performed by the same system 150 which performed transformations. If lighting values are to be calculated, the appropriate instruction is provided to and decoded by the processor 160. Four multiplications can then be provided per cycle and a single-cycle throughput maintained for calculation of lighting values.

For some of the other operations provided using the data processing system 150, data may not be written back into the same buffer, then output. This is in contrast to transformations and occurs because other operations may result in an output which occupies a different amount of space than the data input. In such a case, the data from buffer A 204 may be written to buffer B 206 after processing, and vice versa. In addition, the processing of data in one of the buffers A 204 and B 206 may not be performed concurrently with the filling of the other buffer B 206 and A 204, respectively. Furthermore, data may not be alternately provided between the buffers A 204 and B 206.

A method and system has been disclosed for a more efficient, flexible system and method for processing graphics data. Software written according for the present invention is to be stored in some form of computer-readable medium, such as memory, CD-ROM or transmitted over a network, and executed by a processor. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for processing graphics data in a computer system comprising:
   a general-purpose processor including an instruction queue, the instruction queue for holding a plurality of instructions;
   a vector co-processor, coupled with the general-purpose processor, for processing at least a portion of the graphics data using a portion of the plurality of instructions, the vector co-processor capable of performing a plurality of mathematical operations in parallel, the plurality of instructions being written in a general-purpose programming language;
   wherein the vector co-processor further includes a first data path and a second data path, the first data path including a single operand unit for performing a first plurality of operations on a single input to the vector co-processor, the second data path including a plurality of multipliers and a plurality of adders for performing a second plurality of operations, the single operand unit being in the first data path but not the second data path.

2. The system of claim 1 wherein the plurality of mathematical operations are a plurality of multiply operations and wherein the plurality of multipliers perform the plurality of multiply operations in parallel.

3. The system of claim 2 wherein the plurality of multipliers provide a first plurality of resultants and wherein the plurality of adders are included in an adder tree, coupled to the plurality of multipliers, including at least one stage, the adder tree for adding at least a portion of the first plurality of resultants;
   a plurality of resultant paths coupled with the plurality of multipliers and the adder tree for providing the plurality of resultants from the plurality of multipliers or a second plurality of resultants from the at least one stage of the adder tree.

4. The system of claim 1 wherein the vector co-processor further includes:
   a first vector buffer and a second vector buffer, wherein the vector co-processor can perform the plurality of mathematical operations on a first portion of the graphics data from the first vector buffer while a second portion of the graphics data is being provided to the second vector buffer and wherein the vector co-processor can perform the plurality of mathematical operations on the second portion of the graphics data from the second vector buffer while the first portion of the graphics data is being provided to the first vector buffer.

5. The system of claim 1 wherein the vector co-processor further includes:
   a direct memory access unit for obtaining data directly from a memory.

6. The system of claim 5 wherein the memory includes a system memory.

7. The system of claim 5 wherein the memory includes a local memory.

8. The system of claim 1 wherein the vector co-processor is capable of processing the at least the portion of the graphics data while the general-purpose processor performs a plurality of other operations.

9. The system of claim 8 wherein the plurality of other operations further include processing a second portion of the graphics data.

10. The system of claim 9 wherein the plurality of other operations are used in processing the graphics data.

11. The system of claim 1 wherein the plurality of operations are a plurality of multiplies, wherein the system further includes a memory and wherein vector co-processor further includes:
    a first vector buffer and a second vector buffer, wherein the vector co-processor can perform the plurality of mathematical operations on a first portion of the graphics data from the first vector buffer while a second portion of the graphics data is being provided to the second vector buffer and wherein the vector co-processor can perform the plurality of mathematical operations on the second portion of the graphics data from the second vector buffer while the first portion of the graphics data is being provided to the first vector buffer;
    wherein the plurality of multipliers are coupled with the first vector buffer and the second vector buffer, and perform the plurality of multiply operations in parallel to provide a first plurality of resultants;
    wherein the plurality of adders are included in an adder tree, coupled to the plurality of multipliers, the adder tree including at least one stage, the adder tree for adding at least a portion of the first plurality of resultants;
    a plurality of resultant paths, coupled to the plurality of multipliers and the adder tree, for providing the plurality of resultants from the plurality of multipliers or a second plurality of resultants from the at least one stage of the adder tree;

a resultant mask coupled with the plurality of resultant paths, the first vector buffer and the second vector buffer; and a direct memory access unit, coupled with the first buffer and the second buffer, for accessing a memory.

12. The system of claim 11 wherein the single operand unit is coupled with the first vector buffer and the second vector buffer and performs the plurality of operations on the single input from the first vector buffer or the second vector buffer.

13. The system of claim 1 wherein the vector co-processor is capable of performing transformations, clipping and a determination of at least one lighting value for the at least the portion of the graphics data.

14. A method for processing graphics data in a computer system comprising the steps of:
   (a) providing a plurality of instructions for processing the graphics data to a general-purpose processor including an instruction queue, the instruction queue for holding the plurality of instructions;
   (b) processing the graphics data utilizing a vector co-processor coupled with the general-purpose processor, the vector co-processor processing the graphics data using the plurality of instructions, the vector co-processor processing the graphics data by performing a plurality of mathematical operations on a portion of the graphics data in parallel, the plurality of instructions being provided using software written in a general-purpose programming language;
   wherein the vector co-processor further includes a first data path and a second data path, the first data path including a single operand unit for performing a first plurality of operations on a single input to the vector co-processor, the second data path including a plurality of multipliers and a plurality of adders for performing a second plurality of operations, the single operand unit being in the first data path but not the second data path.

15. The method of claim 14 wherein the plurality of mathematical operations are a plurality of multiply operations, wherein the plurality of multipliers are coupled in parallel and wherein the processing step (b) further includes the step of:
   (b1) processing the portion of the plurality of data by performing the plurality of multiply operations in parallel using the plurality of multipliers.

16. The method of claim 15 wherein the plurality of multipliers provide a first plurality of resultants, wherein the vector co-processor further includes an adder tree including at least one stage coupled to the plurality of multipliers and a plurality of resultant paths coupled to the plurality of multipliers and the at least one stage of the adder tree, and wherein the processing step (b) further includes the step of:
   (b2) adding a first portion of the first plurality of resultants utilizing the adder tree if plurality of instructions includes instructions for adding the first portion of the plurality of resultants; and
   (b3) providing the plurality of resultants from the plurality of multipliers or a second plurality of resultants from the at least one stage of the adder tree if the plurality of instructions includes instructions for providing the plurality of resultants from the plurality of multipliers or the second plurality of resultants from the at least one stage of the adder tree;

wherein the adder tree includes the plurality of adders.

17. The method of claim 14 wherein the vector co-processor further includes a first vector buffer and a second vector buffer and wherein the processing step (b) further includes the steps of:
   (b1) providing a portion of the graphics data alternatively to the first vector buffer and the second vector buffer;
   (b2) utilizing the vector co-processor to perform the plurality of mathematical operations on a first portion of the graphics data from the first vector buffer while a second portion of the graphics data is being provided to the second vector buffer and to perform the plurality of mathematical operations on the second portion of the graphics data from the second vector buffer while the first portion of the graphics data is being provided to the first vector buffer.

18. The method of claim 14 wherein the vector co-processor further includes a direct memory access unit and wherein the processing step (b) further includes the step of:
   (b1) obtaining a portion of the graphics data directly from a memory of the system utilizing the direct memory access unit.

19. The method of claim 18 wherein the memory includes a system memory.

20. The method of claim 18 wherein the memory includes a local memory.

21. The method of claim 14 wherein the vector co-processor is capable of processing the at least the portion of the graphics data while the general-purpose processor performs a plurality of other operations.

22. The method of claim 21 wherein the plurality of other operations further include processing a second portion of the graphic s data.

23. The method of claim 22 wherein the plurality of other operations are used in processing the graphics data.

24. The method of claim 14 wherein the plurality of operations are a plurality of multiplies, wherein the system further includes a memory and wherein vector co-processor further a first vector buffer, a second vector buffer, the plurality of multipliers are coupled to the first vector buffer and the second vector buffer, an adder tree including at least one stage coupled with the plurality of multipliers, a plurality of resultant paths coupled to the plurality of multipliers and the adder tree, a resultant mask coupled with the plurality of resultant paths, the first vector buffer and the second vector buffer, a direct memory access unit coupled with the first vector buffer and the second vector buffer, the method including the steps of:
   (b1) obtaining a portion of the graphics data directly from a memory of the system utilizing the direct memory access unit
   (b2) providing the portion of the graphics data alternatively to the first vector buffer and a the second vector buffer;
   (b3) utilizing the multipliers to perform the plurality of multiply operations on a first portion of the graphics data from the first vector buffer while a second portion of the graphics data is being provided to the second vector buffer and to perform the plurality of multiply operations on the second portion of the graphics data from the second vector buffer while the first portion of the graphics data is being provided to the first vector buffer, the plurality of multipliers thereby providing a plurality of resultants;
   (b4) adding a first portion of the first plurality of resultants utilizing the adder tree if plurality of instructions includes instructions for adding the first portion of the plurality of resultants; and (b4) providing a second portion of the plurality of resultants from the plurality of multipliers or a second plurality of resultants from the at least one stage of the adder tree if the plurality of instructions includes instructions for providing the plurality of resultants from the plurality of multipliers or the second plurality of resultants from the at least one stage of the adder tree (b5) utilizing the mask to provide the second portion of the plurality of resultants or the second plurality of resultants to the first vector buffer or the second vector buffer if a portion of the plurality of instructions indicate that the second portion of the plurality of resultants or the second plurality of resultants are to be provided to the first vector buffer or the second vector buffer; and wherein the adder tree includes the plurality of adders.

25. The method of claim 24 wherein the single operand unit is coupled with the first vector buffer and the second vector buffer, the method further comprising the step of:

(b6) performing a plurality of operations on a single input from the first vector buffer or the second vector buffer if a second portion of the plurality of instructions indicates that the plurality of operations are to be performed on the single input.

26. The method of claim 14 wherein the processing step (b) includes the step of:

(b1) performing a transformation, clipping and a determination of at least one lighting value for the graphics data.

* * * * *